April 16, 1940.                    J. BIJUR                    2,196,970
                                  LUBRICATION
                          Original Filed Aug. 9, 1922
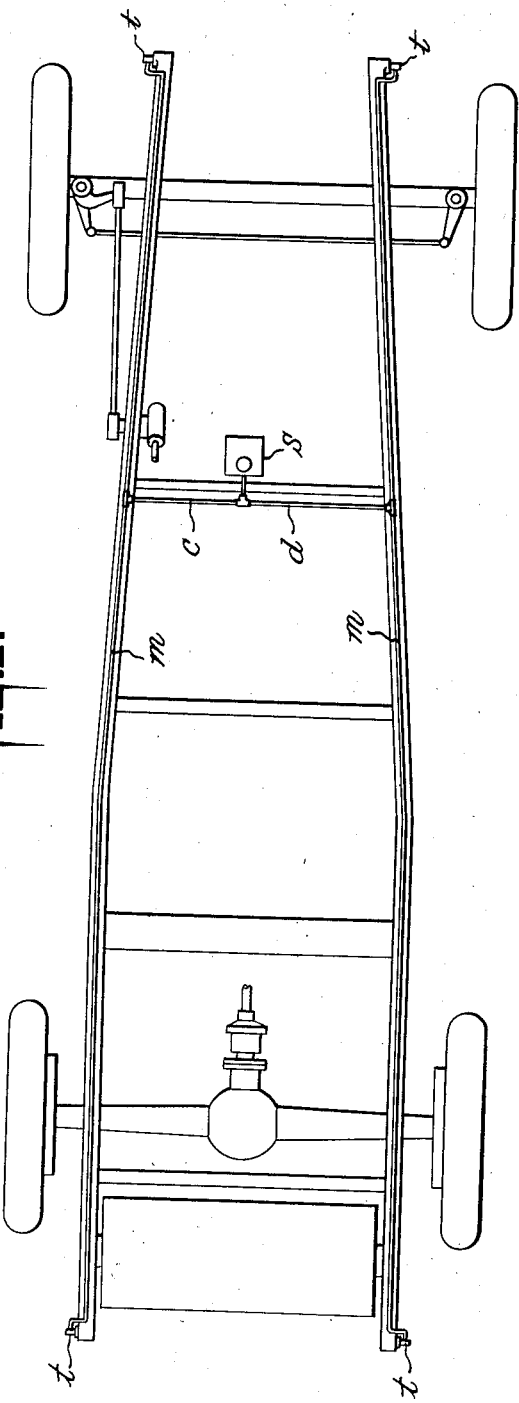
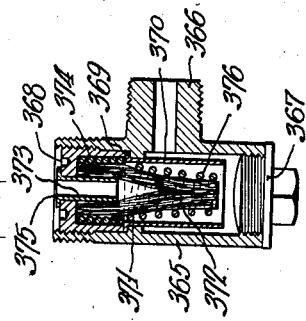
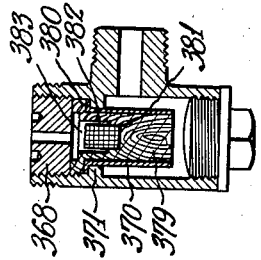
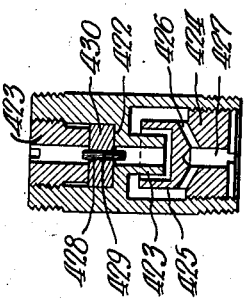
INVENTOR
Joseph Bijur, Deceased
by George Bijur, Executor
BY
ATTORNEYS Patented Apr. 16, 1940

2,196,970

UNITED STATES PATENT OFFICE 2,196,970

LUBRICATION

Joseph Bijur, deceased, late of New York, N. Y., by George Bijur, executor, New York, N. Y.; said Joseph Bijur assignor, by mesne assignments, to Auto Research Corporation, a corporation of Delaware Original application August 9, 1922, Serial No. 580,668. Divided and this application October 9, 1934, Serial No. 747,499

8 Claims. (Cl. 184—7)

The present invention relates primarily to central lubrication and is more especially concerned with valving and/or metering flow control devices for central lubricating systems where small quantities of lubricant are to be fed to a plurality of bearings from a central pump and/or reservoir, for example, of the general type disclosed in issued Patents Nos. 1,632,771 and 1,632,772 of June 14, 1927, and known as "drip plugs," the flow rating of which is not subject to fortuitous variation, and which have a restricting effect predominating over the restricting effect of the longest conduit or tightest bearing, said restricting effect of the metering device often ranging from 10 to several hundred times the restricting effect of said longest line or tightest bearing.

In metering devices of the flow restriction type disclosed in Patents No. 1,632,771 and No. 1,632,772, it is customary to provide separate strainer, valve, and restriction elements, the restriction being preferably of the pin-in-bore type and being relatively fixed in position and the valve being of the flat disk type and being positioned in an outlet socket and enclosed between a valve seat and a valve retainer. The socket may be a large one to receive a coil spring for seating the valve, or a relatively small one with springless valves.

In said patents the restriction element consists of a rigid imperforated rod of metal which fits into a bore of slightly larger diameter to create the restricting effect.

In the present application the restricting effect is obtained by an element consisting of a naturally or artificially compact group of strands or fibres, preferably longitudinal of the direction of lubricant flow between which strands, filaments, fibres or rods are formed restricting the capillary passages affording a very high obstruction to the flow of lubricant.

This application is a division of application Serial No. 580,668, filed August 9, 1922, now Patent No. 1,975,920.

In the accompanying drawing in which are shown one or more of various possible embodiments of the several features of the invention, Fig. 1 is a diagrammatic view indicating the application of the central lubrication system of the present invention to a chassis, Fig. 2 is a transverse sectional view on a larger scale showing the construction of one embodiment of a preferred metering or drip plug fitting, and Figs. 3 and 4 are views similar to Fig. 2 of other embodiments.

Referring now to the drawing, in Fig. 1 there is shown diagrammatically the general layout of the chassis of an automobile having a lubricant supply unit S, illustratively on the dashboard. The supply unit S may be fed from the engine oil pump or a separate reservoir may be provided and it may include a manually and/or automatically operated pump actuated directly from the machine being lubricated, as by a mechanical drive, or indirectly by an inertia motor, a piston motor or a diaphragm motor to feed the bearings intermittently or continuously. The distributing system includes headers c and d, which communicate at their ends with the respective mains m extending the length of the channel frames and feeding various bearings at or near which the drip plug terminals t are applied. Bridging conduits (not shown) are provided leading to similar drip plugs (not shown) at or near the corresponding bearings on the axle or other unsprung parts.

In the fitting of Fig. 2, a plug 368 is threaded into one end of the fitting, the lower end thereof clamping a flange 369 formed on a downwardly extending cylindrical tube 370 against an inwardly extending ledge 371 formed in the cartridge. The tube 370 terminates above plug 367 and below the bore of nipple 366. The seepage material comprises a brush 372 of wires, bristles or other similar rods, fixed about an axial tube 373, as by a binding wire 374 and the projecting end 375 of the tube, in turn, is secured as by riveting over the end of the plug 368. The free ends of the bristles are pulled into a tight bundle by a helix 376 of corrugated spring wire which distends under oil pressure to lower the resistance and to correspondingly permit passage of oil therebeyond.

In operation, with the plug in the preferred vertical position, it will be apparent that oil will pass therefrom only when it fills the cartridge at least up to the level of the nipple bore, and the cartridge is, therefore, always full at least to that level. Thus the line is closed against entry of air, since the level of oil in the fitting is always above the lower end of the tube 370, the oil seal thus formed remains effective to prevent the entry of air into the line. If desired, a spring seated or spring flap or disk check valve may also be employed.

In the embodiment of Fig. 3, the seepage mass comprises a block 379 of wood or other fibrous, porous, inorganic or organic, synthetic or natural material having a flanged end 380 clamped against the ledge 371 of the cartridge by the closure plug 368, the length of the wood block fitting tightly within the metallic cylinder 370. Preferably, the block 379 has an axial depression 381 within which is snugly fitted a filter plug 382 which projects upward into a cavity 383 of large diameter to permit the preliminary filtering action, for preventing the clogging of the block by the accumulation of impurities therein.

The form of Fig. 4 involves a cylindrical pipe element cartridge having an integral inner ledge 422 formed with a short integral axial tube 423. The outlet plug 424 is formed with a cup-shaped inner end 425. The cup 425 is telescoped over sleeve 423 with clearance. An oil seal is thus formed as will be apparent, and ducts 426 afford communication therefrom to the outlet passage 427. The seepage resistance in this embodiment comprises a multiplicity of small short wires 428, forced as a tight bundle into a central aperture 429 in a thick circular washer 430 of lead or similar compressible metal. The block is maintained against the flange of seat 422 within the fitting by an inlet plug 423 threaded into the cartridge. The compacted bundle 428 of wires offers a multiplicity of minute passages for the lubricant in which the pressure is, of course, absorbed.

It is, of course, understood that any of the various seepage or drip plug constructions described may be used on any lubricating line, in the run thereof or at the end thereof, or in combination with junctions or casings, and adjacent to and/or removed from the bearing, as shown in Patents Nos. 1,845,827, 1,862,482, 1,903,499, 1,929,434, 1,937,507 and 1,943,326, or the installation may be equipped at various parts with other drip plug or metering fittings of different design, as for example, of the other designs disclosed in said application, Serial No. 580,668.

Where it is desirable to maintain the lines substantially filled with lubricant at all times, the lines should be sealed so as to prevent air being drawn in at a higher outlet and lubricant seeping out at a lower outlet as by spring seated ball or flat disk valves, oil seals as shown in devices of Patent No. 1,734,027, and/or by springless flap and free floating disk valves, which valves may be included in the "drip plugs" and/or placed at the heads of the branches or lines feeding lubricant to a single bearing or a group of bearings at the same level.

Figs. 2, 3 and 4 of the present application correspond respectively to Figs. 28, 30 and 37 of said parent application, Serial No. 580,668, and Fig. 1 of the present application corresponds substantially to Fig. 1 of said parent application, which has been simplified in its present showing.

What is claimed is:

1. In a lubricating system of the type comprising a central source of lubricant, a metering unit for supplying lubricant to a bearing, of such high restricting effect as in itself to control proportionment of lubricant in a centralized lubricating installation having an elongated distributing piping system substantially completely filled with lubricant and leading to the bearings, said restricting effect being tremendously greater than the restricting effect of the piping and bearings, and being so high as to permit lubricant flow only under substantial pressure applied through the column of lubricant in the piping and also so high as to substantially prevent gravity flow, said unit including a rigid capillary member through which the lubricant passes, said member being laterally compressed radially toward its central axis, the direction of said compression being transverse to the direction of flow, said flow being caused to take place through said member.

2. In a lubricating system of the type comprising a central source of lubricant, a metering unit for supplying lubricant to a bearing, of such high restricting effect as in itself to control proportionment of lubricant in a centralized lubricating installation having an elongated distributing piping system substantially completely filled with lubricant and leading to the bearings, said restricting effect being tremendously greater than the restricting effect of the piping and bearings, and being so high as to permit lubricant flow only under substantial pressure applied through the column of lubricant in the piping and also so high as to substantially prevent gravity flow, said unit including a rigid capillary member through which the lubricant passes, said rigid member consisting of a fibrous material, the fibres of which extend longitudinally of the direction of flow of lubricant, said member being laterally compressed radially toward its central axis, the direction of said compression being transverse to the direction of flow, said flow being caused to take place through said member.

3. A flow metering device, of such high restricting effect as in itself to control proportionment of lubricant in a centralized lubricating installation having an elongated distributing piping system substantially completely filled with lubricant and leading to the bearings, said restricting effect being tremendously greater than the restricting effect of the piping and bearings, and being so high as to permit lubricant flow only under substantial pressure applied through the column of lubricant in the piping and also so high as to substantially prevent gravity flow, said device consisting of a fitting having threaded inlet and outlet connections, whereby the fitting may be connected to a distributing tubing system, which will supply lubricant under substantial pressure to said inlet connection, and to a bearing to receive lubrication from said outlet connection, and a compressible resistance mass interposed between the inlet and outlet connections provided with a resilient compressing means, which means will be distended to decrease the amount of resistance upon substantial pressure, said resilient compressing means taking the form of a coil spring closely encircling the sides of said mass and compressing said mass transverse to the direction of lubricant flow.

4. In a centralized lubricating installation, a fitting construction provided with threaded inlet and outlet connections to a tubing system and to a bearing structure to receive lubricant, and a flow restriction interposed between said inlet and outlet connections, of such high restricting effect as in itself to control proportionment of lubricant in a centralized lubricating installation having an elongated distributing piping system substantially completely filled with lubricant and leading to the bearings, said restricting effect being tremendously greater than the restricting effect of the piping and bearings, and being so high as to permit lubricant flow only under substantial pressure applied through the column of lubricant in the piping and also so high as to substantially prevent gravity flow, including an elongated block of wood with an inlet face, an outlet face and extended side surfaces and a casing for said block of wood preventing passage of lubricant through the side surfaces thereof, whereby lubricant is compelled to pass through the entire block from the unconfined inlet to the unconfined outlet face thereof.

5. In a centralized lubricating system, a high restriction metering fitting, of such high restricting effect as in itself to control proportionment of lubricant in a centralized lubricating installation having an elongated distributing piping system substantially completely filled with lubricant and leading to the bearings, said restricting effect being tremendously greater than the restricting effect of the piping and bearings, and being so high as to permit lubricant flow only under substantial pressure applied through the column of lubricant in the piping and also so high as to substantially prevent gravity flow, including an elongated block of wood, and means to restrict ingress and egress of lubricant in respect to said block of wood to the ends thereof, the inlet end of said block of wood being provided with a cavity receiving an inlet strainer.

6. In a centralized lubricating installation, a device including as a restriction element, an elongated mass, laterally constricted, to form a plurality of capillary passages of high restricting effect therethrough, a lubricant receiving chamber below said mass and receiving lubricant which seeps therethrough, said chamber having an outlet substantially above the bottom thereof and a tube depending into said chamber receiving the flow from said mass, and forming a seal in respect to said chamber.

7. In a central lubricating installation for a mechanism of the type having a plurality of bearings including a central source of lubricant supply and pressure, a conduit system with an inlet from said source and branches, each branch including a flow metering unit; each said flow metering unit comprising an elongated resistance member tightly held within the corresponding branch and consisting of a porous capillary filler member, laterally constricted and forming capillary passages parallel to the direction of flow, said member having a much greater resistance to lubricant flow than the rest of the conduit system and the bearings, whereby it will have a predominating effect upon the rate of flow toward the bearing, will only permit substantial flow toward the bearing under applied pressure and will substantially prevent gravity flow.

8. In a centralized lubricating installation for a mechanism of the type having a plurality of bearings including a central source of lubricant supply and pressure, a conduit system with an inlet from said source and branches, each branch including a flow metering unit; each said flow metering unit comprising a resistance member tightly held within the corresponding branch and consisting of a porous capillary filler member composed of a mass of bristles tightly compacted by a coil spring encircling the same, said compacted bristles having a much greater resistance to lubricant flow than the rest of the conduit system and the bearings, whereby they will have a predominating effect upon the rate of flow toward the bearing, will only permit substantial flow toward the bearing under applied pressure and will substantially prevent gravity flow.

GEORGE BIJUR,
*Executor of the Estate of Joseph Bijur, Deceased.*